United States Patent [19]

Spacht

[11] 3,728,399

[45] Apr. 17, 1973

[54] AKYLTHIO SUBSTITUTED POLYNUCLEAR PHENOLS

[75] Inventor: Ronald B. Spacht, Hudson, Ohio

[73] Assignee: The Goodyear Tire & Rubber Company, Akron, Ohio

[22] Filed: Sept. 10, 1970

[21] Appl. No.: 71,230

Related U.S. Application Data

[62] Division of Ser. No. 664,601, Aug. 30, 1967, Pat. No. 3,565,857.

[52] U.S. Cl. ..............................260/609 F, 260/608
[51] Int. Cl. ......................C07c 149/36, C07c 149/38
[58] Field of Search ..........................260/609 F, 608

[56] References Cited

UNITED STATES PATENTS

| | | | |
|---|---|---|---|
| 3,423,389 | 12/1969 | Wheelus | 260/609 F X |
| 3,320,163 | 5/1967 | Abbott et al. | 260/608 X |
| 3,044,960 | 7/1962 | Morway et al. | 260/609 F X |
| 3,035,908 | 5/1962 | Gottshall et al. | 260/609 F X |
| 2,346,826 | 4/1944 | Cook et al. | 260/608 |

*Primary Examiner*—Lewis Gotts
*Assistant Examiner*—D. R. Phillips
*Attorney*—F. W. Brunner and Vernon G. Parker

[57] ABSTRACT

Alkylthio substituted polynuclear phenolic age resisters and age resistant polymers containing said age resisters.

4 Claims, No Drawings

AKYLTHIO SUBSTITUTED POLYNUCLEAR PHENOLS

This is a division of application Ser. No. 664,601, filed Aug. 30, 1967 and which issued on Feb. 23, 1971, as U.S. Pat. No. 3,565,857.

This invention relates to age resistors for oxidizable organic materials, their preparation and use in the stabilization of polymers which normally tend to deteriorate when exposed to normal atmospheric conditions and in particular when exposed to sunlight and/or elevated temperatures in the presence of air or oxygen.

Polymers have proven to be some of the most difficult organic materials to successfully stabilize against the deleterious effects of oxygen and ozone, particularly rubbery polymers, both natural and synthetic. Both vulcanized and unvulcanized polymers are susceptible to the deleterious effects that are found in normal atmospheric conditions, and although many materials have been suggested and used as polymer stabilizers no completely satisfactory material has been found that will fully protect these polymers under the widely different conditions to nondiscoloring and nonvolatile in polymers.

In accordance with the present invention it has been found that the foregoing and additional objectives can be accomplished by employing as stabilizers for polymeric materials which are subject to the deleterious effects of oxygen, ozone and sunlight, phenolic compounds conforming to the following structural formula:

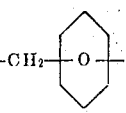

wherein, $R$, $R^1$ and $R^2$ are hydrocarbon radicals containing from one to 20 carbon atoms, $R^3$ and $R^6$ are selected from the group consisting of hydrogen, alkyl radicals containing from one to 12 carbon atoms, cycloalkyl radicals containing from five to nine carbon atoms and aralkyl radicals containing from seven to nine carbon atoms, and $R^4$ and $R^5$ are bivalent radicals selected from the group consisting of bivalent organic radicals and bivalent inorganic radicals and wherein $n$ is a positive integer from 0 to 3.

Preferably $R$, $R^1$ and $R^2$ are alkyl radicals containing from one to 12 carbon atoms.

When $n$ equals 2 or 3 the antioxidant molecule will contain two or three $R^4$ radicals as well as two or three $R^1$ radicals. In such cases the $R^4$ radicals need not necessarily be identical, nor must the $R^1$ radicals necessarily be identical. Examples of specific compounds that conform to the above recited structural formula are represented below by a listing of specific radicals, any combination of which in the structural formula (I) above represents a specific compound within the scope of the present invention.

| $R^3$ and $R^6$ | R, $R^1$ and $R^2$ | $R^4$ and $R^5$ | n |
|---|---|---|---|
| H | $CH_3$— | —$CH_2$— | 0 |
| $CH_3$— | $C_2H_5$— | —S— | 1 |
| $C_2H_5$— | $C_3H_7$— | —S—S— | 2 |
| $C_3H_7$— | $C_4H_9$— | 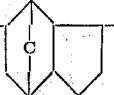 | 3 |
| $C_4H_9$— | $C_5H_{11}$— | ---- | ---- |
| $C_5H_{11}$— | $C_6H_{13}$— | $CH_3CH_2CH_2CH$< | ---- |
| $C_6H_{13}$— | $C_8H_{17}$— | —$CH_2CH=CHCH_2$— | ---- |
| $C_8H_{17}$— | $C_{12}H_{25}$— | 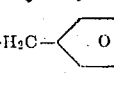 | ---- |
| $C_{12}H_{25}$— | | ---- | ---- |
| 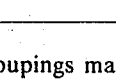 | | ---- | ---- |
| 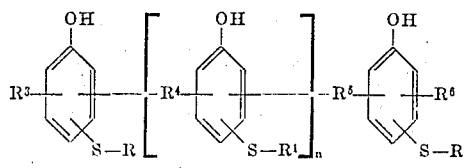 | | ---- | ---- |

The alkyl groupings may be primary, secondary or tertiary.

Preferred compounds of the present invention are those which conform to the above structural formula (I) wherein $R^3$ and $R^6$ are tertiary alkyl radicals containing from four to 12 carbon atoms.

Specific examples of these preferred compounds are represented below by a listing of specific radicals any combination of which in structural formula (I) above represents a specific compound within the scope of the present invention.

| $R^3$ and $R^6$ | R, $R^1$ and $R^2$ | $R^4$ and $R^5$ | n |
|---|---|---|---|
| tertiary butyl | $CH_3$— | —$CH_2$— | 0 |
| tertiary amyl | $C_2H_5$— | —S— | 1 |
| tertiary hexyl | $C_3H_7$— | —S—S— | 2 |
| tertiary heptyl | $C_4H_9$— | $CH_3$\CH—CH< | 3 |
| teritary octyl | $C_5H_{11}$— | $CH_3$/ |  |
| tertiary nonyl | $C_6H_{13}$— | —$CH_2$—$CH_2$—$CH_2$—CH< |  |

| | | | | |
|---|---|---|---|---|
| tertiary dodecyl | $C_8H_{17}-$ | $-CH_2-CH=CHCH_2-$ | | |
| | $C_{12}H_{25}-$ | | | |

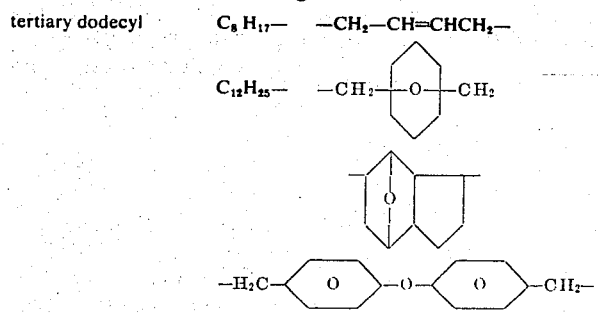

Even more preferred compounds are those wherein $R^3$ and $R^6$ are tertiary alkyl radicals containing from four to 12 carbon atoms and are located ortho to the phenolic hydroxyl group and wherein $R^4$ and $R^5$ are bivalent radicals selected from the group consisting of (A) $-S-$, (B) $-S-S-$; and (C) an organic radical containing from one to 14 carbon atoms.

Specific examples of these more preferred compounds are represented below by a listing of specific radicals any combination of which in structural formula (I) above represent a specific compound within the scope of the present invention wherein $R^3$ and $R^6$ are in the ortho position.

| $R^3$ and $R^6$ | R, $R^1$ and $R^2$ | $R^4$ and $R^5$ | n |
|---|---|---|---|
| tertiary butyl | $CH_3-$ | $-CH_2-$ | 0 |
| tertiary amyl | $C_2H_5-$ | $-S-$ | 1 |
| tertiary hexyl | $C_3H_7-$ | $-S-S-$ | 2 |
| tertiary heptyl | $C_4H_9-$ | $\begin{matrix}CH_2\\ \phantom{x}\diagdown\\ CH-CH\\ \phantom{x}\diagup\\ CH_3\end{matrix}$ | |
| tertiary octyl | $C_5H_{11}-$ | $CH_3-CH_2-CH_2-CH\diagdown$ | |
| tertiary nonyl | $C_6H_{13}-$ | $-CH_2-CH=CH-CH_2-$ | |
| tertiary dodecyl | $C_8H_{17}-$ | | |
| | $C_{12}H_{25}-$ | | |

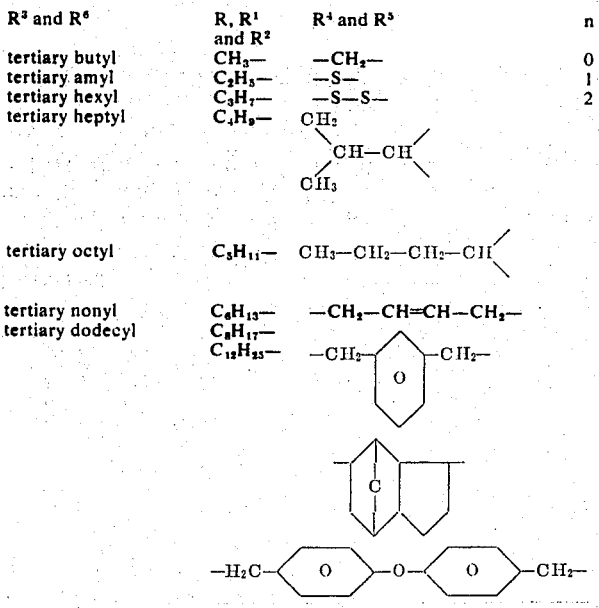

The most preferred compounds are those which conform to above structural formula (I) wherein R, $R^1$ and $R^2$ are selected from the group consisting of methyl, ethyl, propyl and isopropyl radicals, $R^3$ and $R^6$ are tertiary alkyl radicals containing from four to eight carbon atoms and located ortho to the phenolic hydroxyl groups and $R^4$ and $R^5$ are selected from the group consisting of $-S-$, $-CH_2-$,

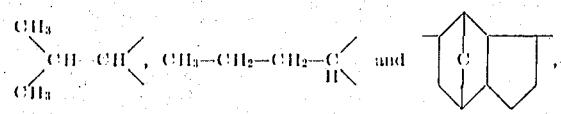

and n is a positive integer from 0 to 1.

Specific examples of the most preferred compounds are as follows:

2,2'-methylene bis(4-methylthio phenol)
2,2'-methylene bis(4-methylthio-6-tertiarybutyl phenol)
2,2'-butylidene bis(4-ethylthio phenol)
2,2'-butylidene bis(4-ethylthio-6-tertiarybutyl phenol)
2,2'-thio bis(4-methylthio phenol)
2,2'-thio bis(4-methylthio-6-tertiarybutyl phenol)
2,2'-dicyclopentadienyl bis(4-methylthio phenol)
2,2'-dicyclopentadienyl bis(4-methylthio-6-tertiarybutyl phenol)
6,6'-methylene bis(3-methylthio phenol)
4,4'-methylene bis(3-methylthio phenol)
2,2'-methylene bis(3-methylthio phenol)
4,4'-methylene bis(3-methylthio-6-tertiarybutyl phenol)
2,2'-methylene bis (3-methylthio-6-tertiarybutyl phenol)

Particularly preferred are 4,4'-methylene bis(3-methylthio-6-tertiarybutyl phenol) and 2,2'-methylene bis(4-methylthio-6-tertiarybutyl phenol).

The compounds of this invention may be prepared by a one step or a two step method. The one step method comprises reacting a mixture comprising (A) at least one phenolic reactant and (B) at least one condensation reactant. The phenolic reactant conforms to the following structural formula:

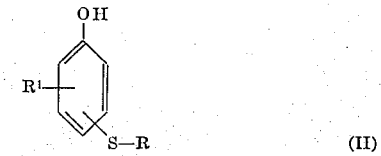

(II)

wherein R is a hydrocarbon radical containing from one to 20 carbon atoms and $R^1$ is selected from the group consisting of hydrogen, alkyl radicals containing from one to 12 carbon atoms, cycloalkyl radicals containing from five to nine carbon atoms and aralkyl radicals containing from seven to nine carbon atoms. Preferably $R^1$ is an alkyl radical containing from one to 12 carbon atoms.

Examples of specific compounds that conform to the above recited structural formula are shown below.

3-methylthio phenol
4-methylthio phenol
2-methylthio phenol
4-ethylthio phenol
3-propylthio phenol
4-octylthio phenol
2-tertiarybutyl-4-methylthio phenol
3-propylthio-6-tertiaryoctyl phenol
3-methylthio-5-methyl phenol
2-ethyl-4-ethylthio phenol Preferred phenolic reactants for the one step method are those according to structural formula (II) wherein R is selected from the group consisting of methyl, ethyl, propyl and isopropyl radicals and wherein $R^1$ is a tertiary alkyl radical containing from four to eight carbon atoms and located ortho to the phenolic hydroxyl group.

Examples of these preferred phenolic reactants are as follows:
2-tertiarybutyl-4-methylthio phenol
3-methylthio-6-tertiaryamyl phenol
3-propylthio-6-tertiaryoctyl phenol
2-tertiaryheptyl-4-ethylthio phenol The most preferred phenolic reactant in the one step method is 2-tertiarybutyl-4-methylthio phenol.

The condensation reactant is a material selected from the group consisting of aldehydes; ketones; sulfur monochloride; sulfur dichloride; dihalo alkenes containing from four to 10 carbon atoms; di(halomethyl) diphenyl oxides; $\alpha,\alpha'$-dihalo xylenes and dicyclopentadienes.

Examples of aldehydes which may be used in the practice of the present invention are as follows:
formaldehyde
acetaldehyde
propionaldehyde
butyraldehyde
isobutyraldehyde
paraldehyde
paraformaldehyde
valeraldehyde Examples of ketones which may be used as condensation reactants are as follows:
acetone
methyl ethyl ketone
methyl isobutyl ketone
methyl isoamyl ketone
diethyl ketone
methyl propyl ketone Examples of dihalo alkenes which may be used are:
1,4-dichlorobutene-2
2-methyl-1,4-dichlorobutene-2
2,3-dimethyl-1,4-dichlorobutene-2
1,4-dichlorohexene-2

Examples of di(halomethyl) diphenyl oxides are:
4,4'-di(chloromethyl)-diphenyl oxide
4,2'-di(chloromethyl)-diphenyl oxide
2,4-di(chloromethyl)-diphenyl oxide Examples of dicyclopentadienes are:
methyl cyclopentadiene dimer
cyclopentadiene dimer Some of the compounds of the present invention can be prepared by a two step method. The two step method comprises reacting in the first step a mixture comprising (A) at least one phenolic reactant and (B) at least one condensation reactant and subsequently in the second step reacting the product of the first step with at least one compound selected from the group consisting of olefins containing from two to 12 carbon atoms, cycloolefins containing from five to nine carbon atoms and arylalkenes containing from seven to nine carbon atoms.

An active halogen compound in some instances can also be used in the second step of the two step method. For example, a compound such as benzyl chloride can be reacted with the product of the first step, normally in the presence of Friedel-Crafts type catalysts to provide an aralkyl substituent.

In the two step method the phenolic reactant conforms to the following structural formula:

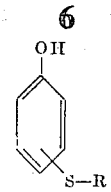

(III)

wherein R is a hydrocarbon radical containing from one to 20 carbon atoms. Preferably R is an alkyl radical containing from one to 12 carbon atoms.

Specific examples of materials conforming to the above recited structural formula are as follows:
2-methylthio phenol
3-methylthio phenol
4-methylthio phenol
3-ethylthio phenol
4-isopropylthio phenol
2-n-butylthio phenol
3-isoamylthio phenol
4-hexylthio phenol
3-octylthio phenol
4-dodecylthio phenol Preferred phenolic reactants for the two step method are those conforming to structural formula (III) wherein R is selected from the group consisting of methyl, ethyl, propyl and isopropyl radicals.

Examples of these preferred phenolic reactants are as follows:
2-methylthio phenol
3-methylthio phenol
4-methylthio phenol
3-ethylthio phenol
4-isopropylthio phenol
4-propylthio phenol
2-ethylthio phenol
4-ethylthio phenol The most preferred phenolic reactants in the two step method are 3-methylthio phenol and 4-methylthio phenol.

The condensation reactant in the two step method is of the same type used in the one step method.

Representative examples of the olefin type materials that can be used in the second step of the two step method are:
1-propene
1-butene
1-pentene
2-pentene
2-methyl-1-propene
2-methyl-1-butene
2-methyl-2-butene
2-methyl-1-pentene
2-methyl-2-pentene
3-methyl-2-pentene
2-methyl-1-hexene
2-methyl-2-hexene
3-methyl-2-hexene
3-methyl-3-hexene
2,4,4-trimethyl-1-pentene
$\alpha$-methylstyrene
vinyl toluene
cyclohexene
styrene
methyl cyclohexene
methyl cyclopentene The most preferred olefins are tertiary olefins possessing four to 12 carbon atoms such as some of those listed above.

The one step method and the first step of the two step method are carried out in essentially the same manner. The reactions for the one step method and the first step of the two step method will vary with the condensation agent. With aldehydes and ketones an acidic catalyst is preferred and the condensation can be carried out by gentle heating. For best results a low boiling solvent capable of azeotropically removing the water as formed is desirable although not necessary. With the active dihalogen compounds such as 1,4 dichloro-butene-2; 4,4'-di(chloromethyl) diphenyl oxide and $\alpha,\alpha'$-dichloro xylenes heat may be necessary along with small amounts of a Friedel-Crafts catalyst. This will depend upon the activity of the dihalo compound. Satisfactory reactions with diolefins as dicyclopentadiene are obtained with $BF_3$. Alkylation, particularly tertiary alkylation, in positions ortho to the hydroxyl groups provides a superior product. Tertiary alkyl groups having four to 12 carbon atoms, and therefore tertiary olefins containing from four to 12 carbon atoms, are preferred. Such alkylated products may be prepared by the one stage or two stage methods. In the one stage method as alkylated, alkylthio phenol is reacted with the condensation reactant. In the two stage method an alkylthio phenol is reacted with the condensation reactant. The resulting product is isolated, dissolved in a suitable solvent, and alkylated with an olefin using a Friedel-Crafts type catalyst, such as toluene sulfonic acid, anhydrous aluminum chloride, anhydrous ferric chloride and sulfuric acid.

Temperatures used for the second step of the two step method are from 20° to 150° C. In general, reactions involving halides will be at higher temperatures than those involving alkylation with olefins. Preferred temperatures for reactions involving elimination of hydrogen halide are from 100° to 150° C. Preferred temperatures for alkylation reactions are from 60° to 100° C.

The charge ratios of the reactants is normally from 1.5 mols of phenolic compound/mol of condensation agent to 5 mols of the phenolic compound/one mol of condensation agent. In the one step method it is preferred to use a solvent and slightly more than one mol of the condensation agent with every two mols of the phenol when the phenol possesses another substituent in addition to the alkylthio substituent. In the two step method and in the one step method where the phenolic reactant does not contain another substituent in addition to the alkylthio grouping it is preferred to use no solvent in the reaction between the phenolic reactant and the condensation reactant. In addition, a preferred ratio of the phenolic reactant to the condensation reactant is 5 mols of the former to one mol of the latter. Among the suitable inert solvents which may be used in the condensation and alkylation reactions are benzene, toluene, xylene, hexane, cyclohexane, carbon tetrachloride and chloroform.

In the two step method the amount of olefin used should be about one to about two mols of olefin per mol of the product of the first step.

Being more specific concerning the condensation reactions, where aldehydes or ketones are the condensation reactants it is preferred that the condensation reaction be run in the temperature range of about 25° to 150° C., preferably at the reflux temperature of the solvent used. Acid catalysts can be used in such condensation reactions.

Where the condensation agent is sulfur monochloride or sulfur dichloride the reaction temperature can be approximately 25° to 150° C., preferably between 25° and 80° C. No catalyst is necessary for this condensation reaction.

Where dihalo xylenes are used the reaction temperature can be 100° to 175° C., preferably 125° to 150° C. and the reaction can be catalyzed with a Friedel-Crafts catalyst.

The dihalo alkenes can be reacted at a temperature of 50° to 150° C., preferably at 80° to 120° C., in the presence of a Friedel-Crafts catalyst.

The di(halomethyl) diphenyl oxides can be reacted with the phenolic reactants in a temperature range of 25° to 175° C., preferably 50° to 100° C. The reaction will take place without the presence of a catalyst. However, it is preferred to use a small amount of Friedel-Crafts catalyst, for example, 0.2 to 5.0 parts for 100 parts of thioalkyl phenol.

The dicyclopentadienes can be reacted from 50° to 150° C., preferably from 75° to 100° C. in the presence of a Friedel-Crafts catalyst. Boron trifluoride is a preferred catalyst.

The following Examples 1 through 9 showing the preparation of compounds conforming to the present invention are intended to be illustrative of the class of compounds disclosed and the method of their preparation but are not to be interpreted as limitations of the invention.

EXAMPLE 1

One hundred and fifty-four grams of 4-(methylthio) m-cresol were dissolved in 200 milliliters of hexane. 2 milliliters of concentrated hydrochloric acid were then added. This mixture was heated to 60° C. and 50 grams of formalin (37.5 percent formaldehyde) was added in 0.5 hour. The mixture was then heated under reflux using a water trap. All of the water was removed in 3 hours. Finally the mixture was heated to pot temperature of 160° C. at 3 millimeters of mercury to remove unreacted materials. The yield was 173.0 grams of product.

EXAMPLE 2

Two hundred milliliters of toluene and 8.0 grams of concentrated sulfuric acid were added to the product from Example 1. The mixture was heated to 100° C. Isobutylene was then added over a period of 4 hours. The catalyst was then neutralized with aqueous sodium carbonate. The aqueous layer was decanted from the mixture and the remainder of the mixture heated to 150° C. to remove any volatiles.

EXAMPLE 3

One hundred and forty grams of para-(methylthio) phenol and 200 milliliters of hexane were warmed to 50° C. Four milliliters of concentrated hydrochloric acid were then added. Fifty grams of formalin (37.5 formaldehyde) were added over a period of 4 hours. The mixture was then heated under reflux using a water trap to remove the water. The reaction was completed in 7 hours. The solvent was then removed. The weight of the reaction product was 148 grams.

EXAMPLE 4

The process of Example 3 was repeated. The product was dissolved in 200 milliliters of toluene and 16 grams of toluene sulfonic acid added to the mixture. It was heated to 100° C. and isobutylene added over a period of several hours. The mixture was then neutralized with aqueous sodium carbonate and digested. The aqueous layer was then decanted. The mixture was heated to 150° C. at 20 millimeters of mercury to remove the volatiles. The weight of the reaction product was 160 grams.

EXAMPLE 5

One hundred and fifty grams of 4(methylthio)-meta-cresol and 200 milliliters of toluene were heated together to 70° C. 134 grams of a commercial di(chloromethyl) diphenyloxide (CMDPO-25) were added to the mixture over a period of 1.5 hours. Heating was continued for several hours. The mixture was then heated to 150° C. at 20 millimeters of mercury to remove the solvent and any unreacted materials. The weight of the reaction product was 250 grams.

EXAMPLE 6

One hundred and fifty grams of product from Example 5 were dissolved in toluene. Twelve grams of toluene sulfonic acid were then added. The mixture was heated to 100° C. and isobutylene added slowly during a period of 3.5 hours. The mixture was washed with water and the water decanted from the mixture. The mixture was neutralized with aqueous sodium carbonate and digested. The water was then decanted. The mixture was heated to 150° C. at 28 millimeters of mercury to remove any volatiles. The weight of product was 177 grams.

EXAMPLE 7

One hundred and forty grams of para-(methylthio) phenol were reacted with 134 grams of di(chloromethyl) diphenyloxide in the manner described in Example 5. The yield was 239.0 grams of product.

EXAMPLE 8

One hundred and thirty-nine grams of product from Example 7 were butylated in the manner described in Example 7. The yield was 158 grams.

The compounds of this invention are useful in protecting polymer in any form, e.g., polymer in latex form, unvulcanized polymer and vulanized polymer. The method of addition of the antioxidant to the polymer is not critical. They may be added by any of the conventional means such as by adding to a polymer latex, milling on an open mill or by internal mixing. They are highly efficient and are capable of being employed in relatively small amounts to effectively stabilize the polymers into which they are incorporated. Normally 0.001 to 5.0 percent of the antioxidant by weight based on the weight of the polymer can be used, although the precise amount of these highly effective stabilizers which is to be employed will depend somewhat on the nature of the polymer and the severity of the deteriorating conditions to which the polymer is to be exposed. In unsaturated polymers such as those made from conjugated dienes, the amount of antioxidant necessary is greater than that required by a saturated polymer such as polyethylene. It has been found that an effective antioxidant of the disclosed stabilizers in rubbery polymers will generally range from 0.05 to 5.0 percent by weight based on the weight of the polymer although it is commonly preferred to use from 0.5 to 2.0 percent by weight based on the weight of the polymer.

The polymers that may be conveniently protected by the phenolic compounds in accordance with this invention are vulcanized and unvulcanized oxidizable rubber and those synthetic oxidizable polymers which are normally susceptible to deterioration by sunlight and atmospheric oxygen such as prepared from conjugated dienes as well as the synthetic polymers and copolymers prepared from monoolefins. Representative examples of the synthetic polymers used in the practice of this invention are polychloroprene; homopolymers of a conjugated 1,3-diene such as isoprene and butadiene and in particular, polyisoprenes and polybutadienes having essentially all of their segmeric units combined in a cis-1,4 structure; copolymers of a conjugated 1,3 diene such as isoprene and butadiene with up to 50 percent by weight of the polymer of at least one copolymerizable monomer such as styrene and acrylonitrile; butyl rubber, which is a polymerization product of a major proportion of a monoolefin and a minor proportion of a multiolefin such as butadiene or isoprene; and polymers and copolymers of monoolefins containing little or no unsaturation, such as polyethylene, polypropylene, ethylene propylene copolymers and terpolymers of ethylene, propylene and a nonconjugated diene.

The practice of this invention is found particularly beneficial when applied to the stabilization of homopolymers of a conjugated 1,3-diene such as isoprene and butadiene and copolymers of said diene with up to 50 percent by weight of at least one copolymerizable monomer such as styrene and acrylonitrile. The practice of this invention is found most beneficial when applied to the stabilization of copolymers of butadiene and styrene.

The stabilizers of this invention can be added to polymers by any of the conventional procedures, that is, directly to the polymer by milling or internal mixing, a latex or solution form of the polymer, etc.

In order to evaluate the effectiveness of the compounds of this invention as stabilizers for polymers representative compounds of this invention were incorporated into an oxidizable polymer.

EXAMPLE 9

The products produced in the previous examples were evaluated in SBR-1006 (a hot emulsion polymerized butadiene/styrene rubber) by oxygen adsorption at 100° C. (Experiments D through K). Also evaluated was an unstabilized SBR 1006 (Experiment A) and two SBR 1006 samples stabilized with two phenolic antioxidants not within the practice of the present invention (Experiments B and C). One part of antioxidant was used in each experiment. The data are summarized below in Table I. The oxygen absorption tests were conducted by dissolving in benzene portions of an SBR polymer (1006) containing 1.00 part per 100 parts of rubbery polymer of various antioxidant compositions of this invention. The cements so formed were poured onto aluminum foil so as to form a thin film. After drying the weight of rubber was obtained in connection with each sample. Thereafter the foil with the adhering rubber strip was placed in the oxygen absorption apparatus. The time required for each sample to absorb 1.0 percent oxygen was determined and recorded in the following table. This testing procedure is described in further detail in Industrial and Engineering Chemistry, 43, p. 456 (1951) and Industrial and Engineering Chemistry, 45, p. 392 (1953).

TABLE I

| Experiment | Antioxidant | Oxygen Absorption Hours to 1% $O_2$ |
|---|---|---|
| A | No antioxidant | 4 |
| B | 4(methylthio) phenol | 71 |
| C | 4(methylthio)-m-cresol | 88 |
| D | R.P.* of 4(methylthio)-m-cresol and formaldehyde | 199 |
| E | Butylated D (Example 3) | 181 |
| F | R.P. of 4(methylthio) phenol and formaldehyde | 120 |
| G | Butylated F (Example 5) | 201 |
| H | R.P. of 4(methylthio)-m-cresol and CMP-25[1](Example 6) | 103 |
| I | Butylated H (Example 7) | 140 |
| J | R.P. of 4(methylthio phenol and CMDPO-25[1](Example 8) | 84 |
| K | Butylated J (Example 9) | 151 |

* - Reaction product
(1) - Di(chloromethyl) diphenyloxide

These results demonstrate the superior activity of the compounds of the present invention (Experiments D through K) as stabilizers for SBR. In all but one of the experiments butylation enhanced the resistance to oxygen absorption under these particular test conditions.

The following Example 10 is illustrative of the practice of the present invention in polypropylene but is not intended to so limit the invention.

EXAMPLE 10

Polypropylene (Pro-Fax 6501) was stabilized with 0.10 part of seven different stabilizers within the scope of the present invention (Experiments N through T). Another portion of the polypropylene was stabilized with 0.10 part of 2,6-ditertiary-butyl-p-cresol. The yield tensiles and melt indices of these stabilized samples were compared with those of an unstabilized polypropylene control (Experiment L).

The polypropylene samples can be prepared in the following manner. The stabilizer can be dissolved in acetone or hexane in a concentration of 1 to 5 percent. The stabilizer solution can then be added to the polypropylene (Pro-Fax 6501) by dispersing the stabilizer solutions in the powdered polypropylene using a Henschel blender and agitating at 2,800 rpm. After 15 minutes the typical batch temperature will normally approach 180° F. and a reasonable dispersion of the stabilizers will be obtained. After 10 minutes only traces of the solvent will normally remain.

The stabilized polypropylene was injection molded to produce tensile bars, said tensile bars conforming to ASTM-D-638-64 T. The tensile bars were aged at 140° C. in a forced air oven. The stress-strain properties of the original and aged samples were measured by an Instron. A 4-½ inch jaw was used, the jaw separation rate being 1 inch per minute.

Melt index determinations were made on the aged and unaged tensile bars which had been cut up into small pieces. The melt index test was run according to ASTM-D-1238-62 T, Condition L. As the polymer degrades the molecular weight is reduced by chain scission. The melt index indicates the molecular weight reduction and is expressed as grams of polymer extruded per unit time. As the molecular weight decreases due to degradation the melt index increases. The test results appear in Table II.

TABLE II

| Experiment | Antioxidant | Yield Tensile (psi) Unaged | Aged | Melt Index[1] Unaged | Aged* |
|---|---|---|---|---|---|
| L | None | 5470 | 3300 | 3.68 | Failed |
| M | 2,6-ditertiarybutyl-p-cresol | 5520 | 5010 | 2.71 | 8.14 |
| N | Example 3 | 5540 | 5010 | 2.63 | 3.27 |
| O | Example 4 | 5460 | 5010 | 1.88 | 3.12 |
| P | Example 5 | 5490 | 4960 | 2.54 | 3.09 |
| Q | Example 6 | 5420 | 4960 | 2.55 | 3.63 |
| R | Example 7 | 5420 | 4980 | 2.87 | 3.33 |
| S | Example 8 | 5540 | 5000 | 2.51 | 3.70 |
| T | Example 9 | 5510 | 5010 | 2.68 | 3.47 |

* - One day at 140° C.
(1) Expressed as grams of polymer extruded per 10 minutes.

The above results reveal the stabilization afforded polypropylene by the compounds of the present invention. Whereas the yield tensile of the unstabilized polypropylene (Experiment L) dropped appreciably on aging, the yield tensile of the polypropylene stabilized with the compounds of the present invention (Experiments N-T) dropped only slightly. Whereas the melt index of the unstabilized polypropylene rose on aging to such a value that it was considered to have failed, the melt index of the polypropylene stabilized with the compounds of the present invention rose only slightly on aging.

In addition, a comparison of the polypropylene stabilized with the compounds of the present invention with polypropylene stabilized with a commercial phenolic antioxidant (Experiment M) reveals that on aging the melt index of the latter material rose much more than the melt indices of the former materials.

While certain representative embodiments and details have been shown for the purpose of illustrating the invention it will be apparent to those skilled in this art that various changes and modifications may be made therein without departing from the spirit or scope of the invention.

What I claim is:
1. A composition of matter conforming to the following structural formula:

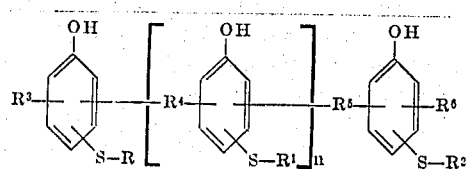

wherein R, $R^1$ and $R^2$ are alkyl radicals containing from one to 12 carbon atoms, $R^3$ and $R^6$ are selected from the group consisting of hydrogen, alkyl radicals containing from one to 12 carbon atoms, cycloalkyl radicals containing from five to nine carbon atoms and aralkyl radicals containing from seven to nine carbon atoms, and $R^4$ and $R^5$ are bivalent radicals selected from the group consisting of thio, dithio, methylene, isobutylidene, butylidene, 1,4-(2-butenylene), xylylenes,

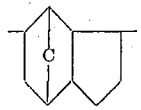

and 4,4'-oxydibenzyl and wherein $n$ is a positive integer from 0 to 3.

2. The composition of matter according to claim 1 wherein $R^3$ and $^6$ are tertiary alkyl radicals containing four to 12 carbon atoms.

3. The composition of matter according to claim 1 wherein R, $R^1$ and $R^2$ are selected from the group consisting of methyl, ethyl, propyl and isopropyl radicals, $R^3$ and $R^6$ are tertiary alkyl radicals containing four to eight carbon atoms and located ortho to the phenolic hydroxyl group and $R^4$ and $R^5$ are selected from the group consisting of —S—, —$CH_2$—,

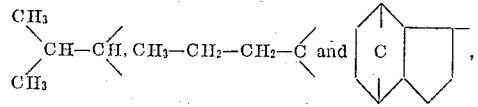

and $n$ is a positive integer from 0 to 1.

4. The composition of matter according to claim 1 wherein $R^4$ and $R^5$ are bivalent radicals selected from the group consisting of methylene, isobutylidene, butylidene, 1,4-(2-butenylene), xylylenes,

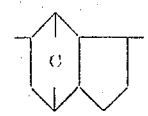

and 4,4'-oxydibenzyl.

* * * * *